(12) United States Patent
Pepe

(10) Patent No.: US 7,796,151 B2
(45) Date of Patent: Sep. 14, 2010

(54) METHOD AND APPARATUS FOR PRINTING WITH REFLECTIVITY

(75) Inventor: Martin J. Pepe, W. Henrietta, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 12/194,824

(22) Filed: Aug. 20, 2008

(65) Prior Publication Data
US 2010/0045770 A1    Feb. 25, 2010

(51) Int. Cl.
*B41J 2/435* (2006.01)
(52) U.S. Cl. .................................. 347/236; 347/246
(58) Field of Classification Search ............... 347/236, 347/237, 246, 247, 129, 267, 259–261, 243; 250/234
See application file for complete search history.

(56) References Cited

U.S. PATENT DOCUMENTS

| 4,831,247 | A | * | 5/1989 | Ishizaka | 358/481 |
| 5,248,997 | A | * | 9/1993 | Summers | 347/261 |
| 5,453,851 | A | * | 9/1995 | Faulhaber | 358/481 |
| 6,078,347 | A | * | 6/2000 | Nukui | 347/246 |
| 6,635,864 | B2 | * | 10/2003 | Hirst | 250/234 |
| 7,492,381 | B2 | * | 2/2009 | Mizes et al. | 347/129 |
| 2003/0063183 | A1 | * | 4/2003 | AuYeung et al. | 347/246 |
| 2008/0117281 | A1 | * | 5/2008 | Pepe | 347/261 |

FOREIGN PATENT DOCUMENTS

JP         01075242 A   *   3/1989

\* cited by examiner

*Primary Examiner*—Hai C Pham
(74) *Attorney, Agent, or Firm*—Oliff & Berridge PLC

(57) ABSTRACT

Aspects of the disclosure provide a method for improving performance of a raster output scanner (ROS) system with a reduced cost. The method can include identifying a current mirror facet of a motor polygon assembly (MPA) including multiple mirror facets that each mirror facet has a reflectivity characteristic, determining a driving signal based on the reflectivity characteristic of the current mirror facet and a performance characteristic of a light source, and driving the light source based on the driving signal to emit light that is reflected by the MPA onto a photoreceptor.

18 Claims, 7 Drawing Sheets

|  | b LIGHT EMITTING DEVICE → | | | 400 |
|---|---|---|---|---|
|  | 1 | 2 | • • • | 32 |
| 1 | $n_1 x b_1$ | $n_1 x b_2$ | • • • | $n_1 x b_{32}$ |
| 2 | $n_2 x b_1$ | $n_2 x b_2$ | • • • | $n_2 x b_{32}$ |
| 3 | $n_3 x b_1$ | $n_3 x b_2$ | • • • | $n_3 x b_{32}$ |
| 4 | $n_4 x b_1$ | $n_4 x b_2$ | • • • | $n_4 x b_{32}$ |
| 5 | $n_5 x b_1$ | $n_5 x b_2$ | • • • | $n_5 x b_{32}$ |
| 6 | $n_6 x b_1$ | $n_6 x b_2$ | • • • | $n_6 x b_{32}$ | n FACET #

CIRCULAR BUFFER MEMORY MAP

METHOD AND APPARATUS FOR PRINTING WITH REFLECTIVITY

BACKGROUND

A printing system may include a raster output scanner (ROS) system to enable printing according to data of a desired image. For example, a ROS system of a printer may generate a plurality of light beams according to the desired image. The plurality of light beams can pass through an optical system of the ROS system, and dissipate charges on a photoreceptor of the printer to create an electrostatic latent image. Further, the electrostatic latent image may attract developing materials, such as toner particles, to create a toner image. Then, the toner image can be transferred to a substrate, such as a piece of paper, to create a desired print.

Aspects of the ROS, such as light intensity, mirror reflectivity, and the like, may affect printing qualities. In a technique to ensure quality printing, the mirror reflectivity can be required to satisfy a tightened tolerance. Such technique may increase a manufacturing cost of the printing system.

SUMMARY

Aspects of the disclosure can provide a method for improving performance of a raster output scanner (ROS) system with a reduced cost. The method can include identifying a current mirror facet of a motor polygon assembly (MPA) including multiple mirror facets that each mirror facet has a reflectivity characteristic, determining a driving signal based on the reflectivity characteristic of the current mirror facet and a performance characteristic of a light source, and driving the light source based on the driving signal to emit light that is reflected by the MPA onto a photoreceptor.

According to the disclosure, the light source can include a plurality of light emitting devices that emit a plurality of light beams. The performance characteristic of a light emitting device may include a light intensity error, and the reflectivity characteristic of the current mirror facet may include a reflectivity error of the current mirror facet. Therefore, the driving signal may include a driving power to the light emitting device. The driver power can be determined as a function of the light intensity error and the reflectivity error. Moreover, the driving power can be determined based on an error correction, which is a product of the light intensity error and the reflectivity error. Additionally, the error correction can be stored corresponding to the light emitting device and the current mirror facet.

According to an aspect of the disclosure, to determine the driving signal, the method can include obtaining an entry corresponding to the current mirror facet and the light emitting device in a buffer table. The buffer table can include at least a first dimension of the multiple mirror facets and a second dimension of the plurality of light emitting devices.

Alternatively, the method can include driving a light emitting device with a first driving power to emit a light beam that is reflected by the current mirror facet, measuring a light intensity of the reflected light beam, calculating an error of the light intensity to a desired light intensity, and determining the driving signal which includes a second driving power to the light emitting device based on the error.

Additionally, according to an aspect of the disclosure, the driving signal may be a function of time.

Further, to identify the current mirror facet of the MPA, the method can include detecting an index signal of a first mirror facet having an index mark, and counting a number of a scan signal. The scan signal may include a start of scan (SOS) signal and an end of scan (EOS) signal.

Aspects of the disclosure can also provide a raster output scanner (ROS). The ROS can include a light source configured to include a plurality of light emitting devices that generate a plurality of light beams, a motor polygon assembly (MPA) configured to include multiple mirror facets to reflect the plurality of light beams, and a controller coupled to the light source, the controller being configured to identify a current mirror facet of the MPA, determine an error correction for a light emitting device corresponding to the current mirror facet based on a combination of the current mirror facet and the light emitting device, and drive the light emitting device based on the error correction to emit a light beam, the light beam being reflected by the current mirror facet.

Further, aspects of the disclosure can provide a printing system. The printing system can include a photoreceptor configured to be charged with a substantially uniform potential, and a raster output scanner (ROS) system configured to scan the photoreceptor according to data of a desired image. The ROS system can further include a light source configured to include a plurality of light emitting devices that generate a plurality of light beams, a motor polygon assembly (MPA) configured to include multiple mirror facets to reflect the plurality of light beams to the photoreceptor, and a controller coupled to the light source, the controller being configured to identify a current mirror facet of the MPA, determine an error correction for a light emitting device corresponding to the current mirror facet based on a combination of the current mirror facet and the light emitting device, and drive the light emitting device based on the error correction to emit a light beam, the light beam being reflected by the current mirror facet to scan the photoreceptor.

EMBODIMENTS

Figure 1:
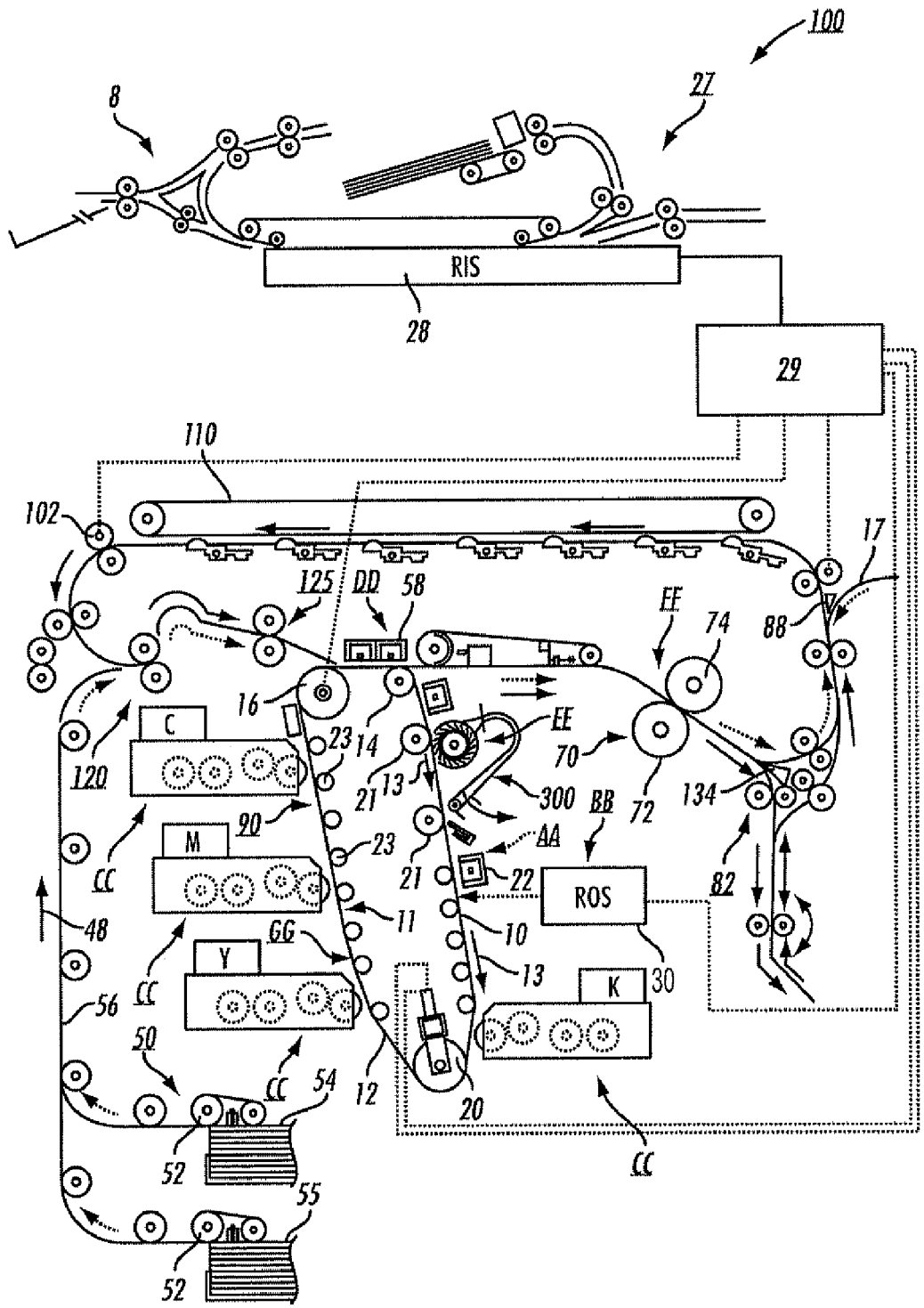
FIG. 1 shows a diagram of an exemplary printing system.

FIG. 1 shows a schematic elevational view of an exemplary printing system according to the disclosure. The printing system 100 can include various components, such as a photoreceptor device GG, a cleaning system EE, a charging system AA, an exposing system BB, a developing system CC, a transferring system DD, a fusing system FF, and the like, that support creating desired images. These elements can be coupled as shown in FIG. 1.

The photoreceptor device GG can be implemented in the form of a photoreceptor belt with a coated layer of a photoconductive material. The photoreceptor device GG can move in a direction of arrow 13 to advance successively to other components of the printing system 100. It should be noted that the photoreceptor device GG can be implemented in other forms, such as a photoreceptor drum.

The cleaning system EE can remove particles, such as residue toner particles, from the surface of the photoreceptor device GG. The charging system AA can prepare the surface of photoreceptor device GG with electrical charges for subsequent printing processes. More specifically, the charging system AA can produce electric fields, such as corona, to charge the surface of the photoreceptor device GG to a substantial uniform potential.

The exposing system BB can include a raster output scanner (ROS) system according to the disclosure. The ROS system can include a light source, which may include a plurality of light emitting devices, such as an array of vertical cavity surface emitting laser (VCSEL) diodes. The plurality of light emitting devices may emit a plurality of light beams corresponding to a desired image. Further, the ROS system can include an optical system that can enable the plurality of light beams to scan the surface of the photoreceptor device GG. The plurality of light beams can then dissipate the charges on the photoreceptor device GG to create an electrostatic latent image. For example, the ROS system may include a motor polygon assembly (MPA), which can have multiple mirror facets. The multiple mirror facets can be arranged to rotate around an axis. Therefore, the multiple mirror facets can sequentially reflect the plurality of light beams.

Additionally, the ROS system may include a controller that can enable components of the ROS system to operate according to the disclosure. The controller can determine a driving signal to the light source based on a combination of performance characteristics of the light source and reflectivity characteristics of the MPA. For example, the controller may calculate an error correction for a combination of a light emitting device, such as a VCSEL diode, and a mirror facet. The error correction can be used to adjust a driving current of the VCSEL diode to emit a light beam accordingly. Therefore, the light beam delivered by the ROS system to the surface of the photoreceptor device GG can have desired properties, such as a desired intensity.

In an embodiment, the controller may include a 2-dimensional error correction table that includes a first dimension of light emitting devices, and a second dimension of mirror facets. Therefore, each entry of the error correction table can store an error correction correspond to a combination of a light emitting device and a mirror facet. Furthermore, an error correction can be a function of time, therefore the error correction can be used to compensate for various imperfections, such as non-uniformity exposure often referred as "smile", and the like. Alternatively, the error correction table can include a third dimension, such as time, and the like.

The developing system CC may include a plurality of developers, for example four developers K, Y, M, and C in FIG. 1. Each developer can bring developing materials, such as toner particles of a color, in contact with the electrostatic latent image on the surface of the photoreceptor device GG. The toner particles can be attracted to the surface of the photoreceptor device GG according to the electrostatic latent image to create a toner image.

The transferring system DD can then transfer the toner image from the surface of the photoreceptor device GG to a supporting sheet, such as a piece of paper. Further, the fusing system FF can permanently fuse the toner image on the supporting sheet.

During operation, for example, the surface of the photoreceptor device GG can turn to the cleaning system EE. The cleaning system EE can remove residue toner particles from a previous printing. Then, the surface of the photoreceptor device GG can move to the charging system AA. The charging system AA can charge the surface of the photoreceptor device GG to a substantially uniform potential. Subsequently, the surface of the photoreceptor device GG can move to the exposing system BB. The exposing system BB, which can deliver a plurality of light beams of substantially uniform intensities according to the disclosure, can dissipate the charges on the surface of the photoreceptor device GG according to a desired image to produce an electrostatic latent image of a high quality.

Further, a developer of the developing system CC can apply toner particles to the surface of the photoreceptor device GG. The toner particles can adhere to the surface of the photoreceptor device GG according to the electrostatic latent image, thereby creating a toner image. The toner image can then be transferred to a supporting sheet.

Figure 2A:
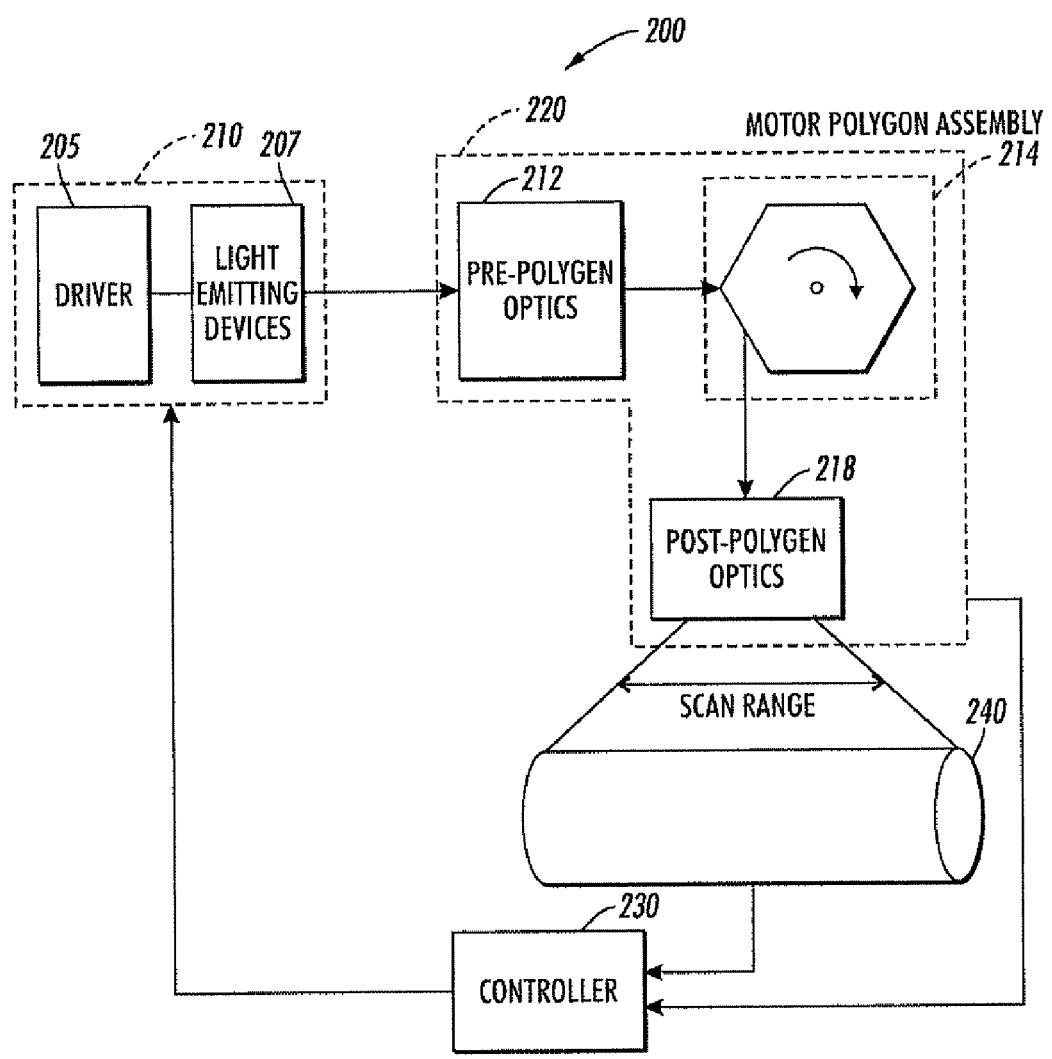
FIGS. 2A-B show diagrams of an exemplary raster output scanner (ROS) system.

FIG. 2A shows a diagram of an exemplary raster output scanner (ROS) system. The ROS system 200 can include a light source 210, which can emit a plurality of light beams, and an optical system 220, which can enable the plurality of light beams to scan a photoreceptor 240. The light source 210 lay further include a driver 205 and a plurality of light emitting devices 207. In addition, the ROS system 200 can include a controller 230 coupled to the light source 210, the optical system 220 and the photoreceptor 240 as shown in FIG. 2A. The controller 230 can enable components of the ROS system 200 to operate in a desired manner.

Figure 2B:
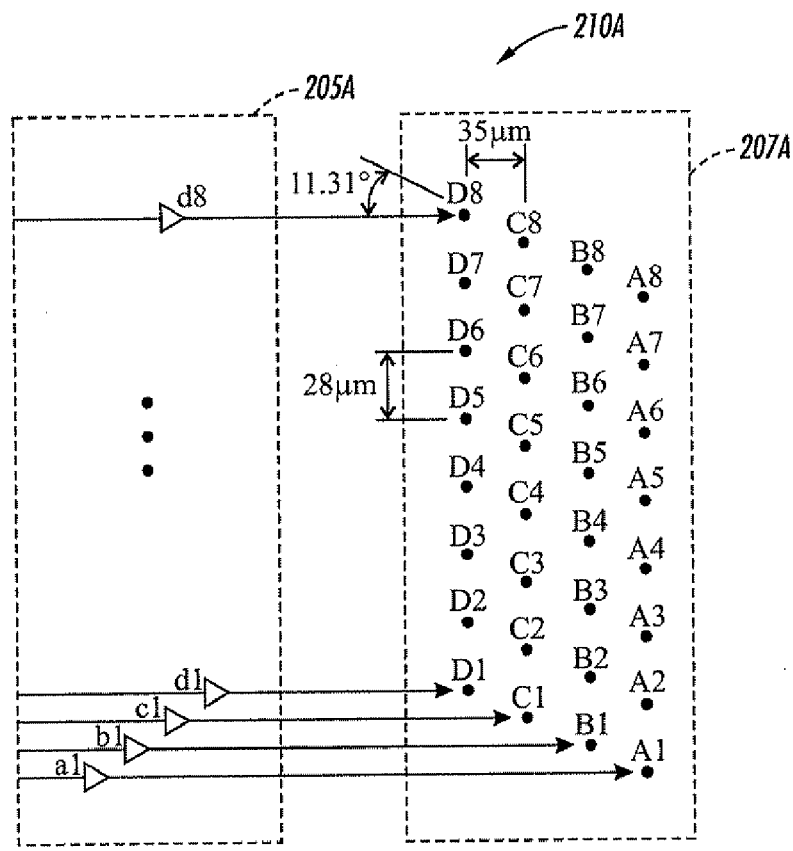

FIG. 2B shows a detailed diagram of an exemplary light source. The light source 210A can include a plurality of light emitting devices 207A, such as an array of vertical cavity surface emitting laser (VCSEL) diodes A1-D8, which can generate the plurality of light beams. The array of VCSEL diodes A1-D8 can be arranged in a desired manner to achieve benefits, such as high speed, high resolution, and a like. For example, the array of VCSEL diodes A1-D8 can be controlled to work in an overscan mode. In the overscan mode, a VCSEL diode may scan a location of a photoreceptor that is previously scanned by another VCSEL diode. Of course it should be understood that various other light source may also be used to generate the plurality of light beams.

Further, the light source 210A can include a driver 205A. The driver 205A can include a plurality of driving circuits, such as driving circuits a1-d8. Each driving circuit may provide a driving power, such as a driving current or a driving voltage, to a light emitting device, such as a VCSEL diode, to generate a light beam accordingly. The driving power may control an intensity of the light beam. For example, varying a driving current to a VCSEL diode may vary a light intensity of a generated light beam.

Due to numerous variations, such as manufacturing variation, environmental variation, location variation, and the like, the plurality of light beams generated by the plurality of light emitting devices 207 may have different light intensities. For example, the array of VCSEL diodes A1-D8 may have different performance characteristics, such as emitting efficiency that can be a ratio of an emitted light intensity to a driving power. Therefore, when driving powers of a same value are used to drive the array of VCSEL diodes A1-D8, emitted light beams can have different light intensities. The light intensity variation of the array of VCSEL diodes A1-D8 may adversely affect a print quality, for example in the overscan mode.

The optical system 220 can include a motor polygon assembly (MPA) 214 as shown in FIG. 2A. The MPA 214 can include a polygon with multiple mirror facets attached to its sides. One of the multiple mirror facets may have an index mark to assist identifying, for example, the first mirror facet of the MPA 214. In addition, the MPA 214 may include a motor driver (not shown). The motor driver may drive the polygon to rotate around a center axis. While the polygon is rotating, the mirror facets may reflect a plurality of incoming light beams. As a result of movements of the multiple mirror facets, the reflected light beams may form a plurality of scanning light beams.

Various aspects of the MPA 214, such as reflectivities of the multiple mirror facets, angular speed of the motor, and the like, can affect a print quality. For example, the reflectivities of the multiple mirror facets may vary, which may result in a periodic signature corresponding to a number of the multiple mirror facets. The disclosure can provide a method to compensate for the reflectivity variation of the multiple mirror facets.

Additionally, the optical system 220 may include a pre-polygon optics 212 that can prepare the plurality of incoming light beams to the MPA 214, and a post-polygon optics 218 that can assist the plurality of scanning light beams to scan the surface of the photoreceptor 240.

The pre-polygon optics 212 may include a collimator lens (not shown) that can parallel the plurality of incoming light beams. In an embodiment, the pre-polygon optics 212 may include a photo-detector. The photo-detector may detect a plurality of light intensities corresponding to the plurality of light emitting devices that generate the plurality of light beams. For example, the photo-detector can be activated during a calibration process to detect the plurality of light intensities. The plurality of light intensities can be transmitted to the controller 230. The controller 230 can compare the plurality of light intensities to a standard to calculate a plurality of light intensity errors corresponding to the plurality of light emitting devices.

The post-polygon optics 218 may include various refraction mirrors that can enable the plurality of scanning light beams to scan the surface of the photoreceptor 240 in a scan range. Furthermore, the post-polygon optics 218 may include various photo-detectors that can be configured to detect various signals to assist operations of the ROS system 200. For example, the post-polygon optics 218 may include an index detector that can detect the index mark of the one of the multiple mirror facets. For another example, the post-polygon optics 218 may include a start of scan (SOS) detector that can be placed at a start location of the scan range. The SOS detector may generate a pulse corresponding a detected scan. Alternatively, the post-polygon optics 218 may include an end of scan (EOS) detector that can be placed at an end location of the scan range. The EOS detector may generate a pulse corresponding to a detected scan.

In an embodiment, the SOS detector may detect a light intensity of a light beam. For example, the SOS detector may generate a voltage having an amplitude that corresponds to the light intensity. The voltage signal can be transmitted to the controller 230. The controller 230 may compare the voltage signal to a signal detected before reflection to determine a reflectivity of a current mirror facet. Further, the controller 230 may compare the reflectivity to a standard to determine a reflectivity error of the current mirror facet. The reflectivity error can be combined with a light intensity error to decide an error correction for a light emitting device to emit a light beam that can form a desired scanning light beam.

It should be understood that the error correction can be calibrated by various techniques. In one embodiment, the reflectivity errors and the intensity errors can be calibrate during manufacturing of a printing device, such as during ROS alignment, and pre-stored in a memory medium, which can be included with the printing device. In another embodiment, various detectors can be included with the printing device to calibrate the reflectivity errors and the light intensity errors during operation. Those reflectivity errors and the light intensity errors can be used to update the pre-stored errors. In another embodiment, before a printing job starts, a first driving power can be used to drive a light emitting device to emit a light beam. Subsequently, the light beam can be reflected by a mirror facet. The reflected light beam can be detected by a detector. The detector can measure a light intensity of the reflected light beam. The measured light intensity can be compared to a desired light intensity to determine an error correction. The error correction can be stored. Further, the error correction can be used to determine a second driving power that can be used during the printing job to drive the light emitting device. In such a manner, should performance of a printer element degrade over time, the resulting error can be compensated.

The controller 230 can receive various signals, such as the index mark signal, the start of scan signal, the end of scan signal, the light intensity signals, and the like, from the optical system 220, and may also receive signals from the photoreceptor 240. Further, the controller 230 can make decisions based on the signals received and control the light source 210 to adjust driving powers of the plurality of light emitting devices.

Figure 3:
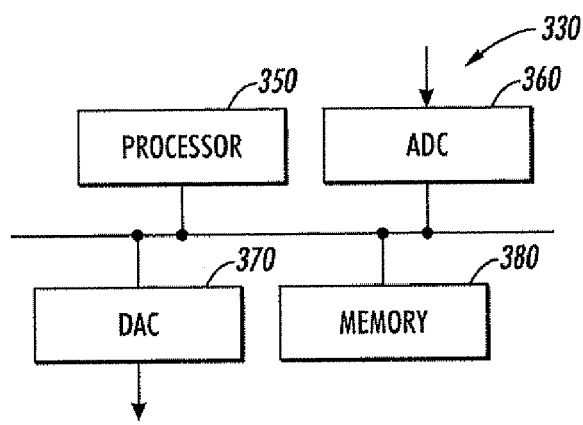
FIG. 3 shows a block diagram of an exemplary controller.

FIG. 3 shows a block diagram of an exemplary controller. The controller 330 may include a processor 350, an analog to digital converter (ADC) 360, a digital to analog converter (DAC) 370, and a memory unit 380. These elements can be coupled together as shown in FIG. 3.

The ADC 360 may receive an analog signal, such as a voltage signal with amplitude corresponding to a light intensity. The ADC 360 can convert the received analog signal to a digital signal. Generally, the digital signal can be stored or processed more efficiently than the analog signal.

The memory unit 380 can store instructions to control the processor 350 to perform accordingly. Further, the memory unit 380 may store data, such as the reflectivity errors, the light intensity errors, the error corrections, and the like. For example, the memory unit 380 may include a first array of the reflectivity errors for the multiple mirror facets, and a second array of the light intensity errors for the plurality of light emitting devices. An algorithm can be implemented to calculate an error correction, such as multiply a reflectivity error from the first array and a light intensity error from the second array, corresponding to a combination of a light emitting device and a current mirror facet.

In another example, the memory unit 380 may include a 2-dimensional buffer table that each entry of the table can store an error correction. For example, the 2-dimensional buffer table may include a first dimension of the plurality of light emitting devices, and a second dimension of the multiple mirror facets. Then, each entry of the table may store an error correction, such as a product of a reflectivity error of a mirror facet and a light intensity error of a light emitting device, corresponding to the light emitting device and the mirror facet. In addition, the 2-dimensional buffer table can be implemented in a form of circular buffer table, which can be used efficiently.

It should be understood that a table of more than 2 dimensions can be implemented to consider more than two affecting factors. For example, a mirror facet may have different effective reflectivities at different angles, such as beginning, center and end. Therefore, a third dimension can be implemented to compensate for angle differences.

The processor 350 can execute instructions stored in the memory unit 380. For example, the processor 350 may execute instructions that can calculate a driving current to a light emitting device. In an embodiment, the memory unit 380 may store an algorithm for calculating an error correction for a light emitting device. The algorithm can include a function that can calculate the error correction based on an identifier of the light emitting device, an identifier of the current mirror facet and time. In another example, the processor 350 may execute instructions that can read a pre-stored error correction from a circular buffer table stored in the memory unit 380. Further, the processor 350 may calibrate a digital number corresponding to the driving current for the light emitting device based on the error correction.

The DAC 370 can convert the digital number into an analog value, such as an electrical current. The electrical current can be provided to a driving circuit to drive a light emitting device to emit a light beam accordingly.

For the ease and clarity of description, the embodiments are presented with a bus type architecture. It should be understood that any other architectures can also be used to couple components inside the controller 300.

Figures 4A, 4B:
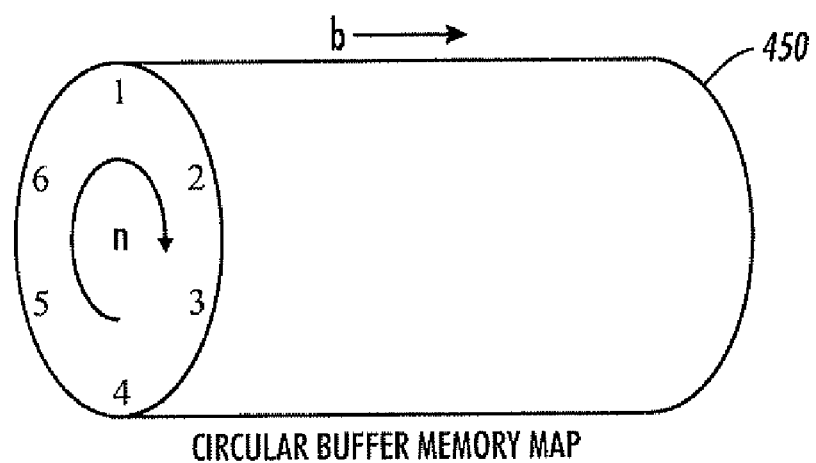
FIGS. 4A-B show an exemplary look-up table.

FIG. 4A shows an exemplary buffer table. The buffer table 400 can have two dimensions—a first dimension n and a second dimension b. The first dimension n can correspond to identifiers for the multiple mirror facets. The second dimension b can correspond to identifiers for the plurality of light emitting devices. Therefore, each entry can store an error correction, which can be a function corresponding to a mirror facet and a light emitting device. For example, as shown in FIG. 4A, each entry can store a product of a reflectivity error of a mirror facet and a light intensity error of a light emitting device. Given a mirror facet identifier and a light emitting device identifier, an error correction can be obtained from the buffer table 400. The error correction can correspond to the mirror facet and the light emitting device.

The error correction can be used to adjust a driving power of the light emitting device. Therefore, the light emitting device can generate a light beam. The light beam can be reflected by the mirror facet to form a scanning light beam. The scanning light beam can have a desired intensity.

FIG. 4B shows an exemplary memory configuration for efficient accessing the 2-dimensional buffer table. The 2-dimensional buffer table can be accessed circularly following a circular buffer memory map 450. For example, when the MPA turns to a current mirror facet, entries corresponding to the current mirror facet can be accessed sequentially to obtain error corrections for the plurality of light emitting devices. When the MPA turns to a next mirror facet, entries corresponding to the next mirror facet can be accessed sequentially to obtain error corrections for the plurality of light emitting devices, so on and so forth. When the MPA turns from a last mirror facet to a first mirror facet, such as from mirror facet 6 to mirror facet 1, the memory map can circulate to entries corresponding to the first mirror facet.

Figure 5A:
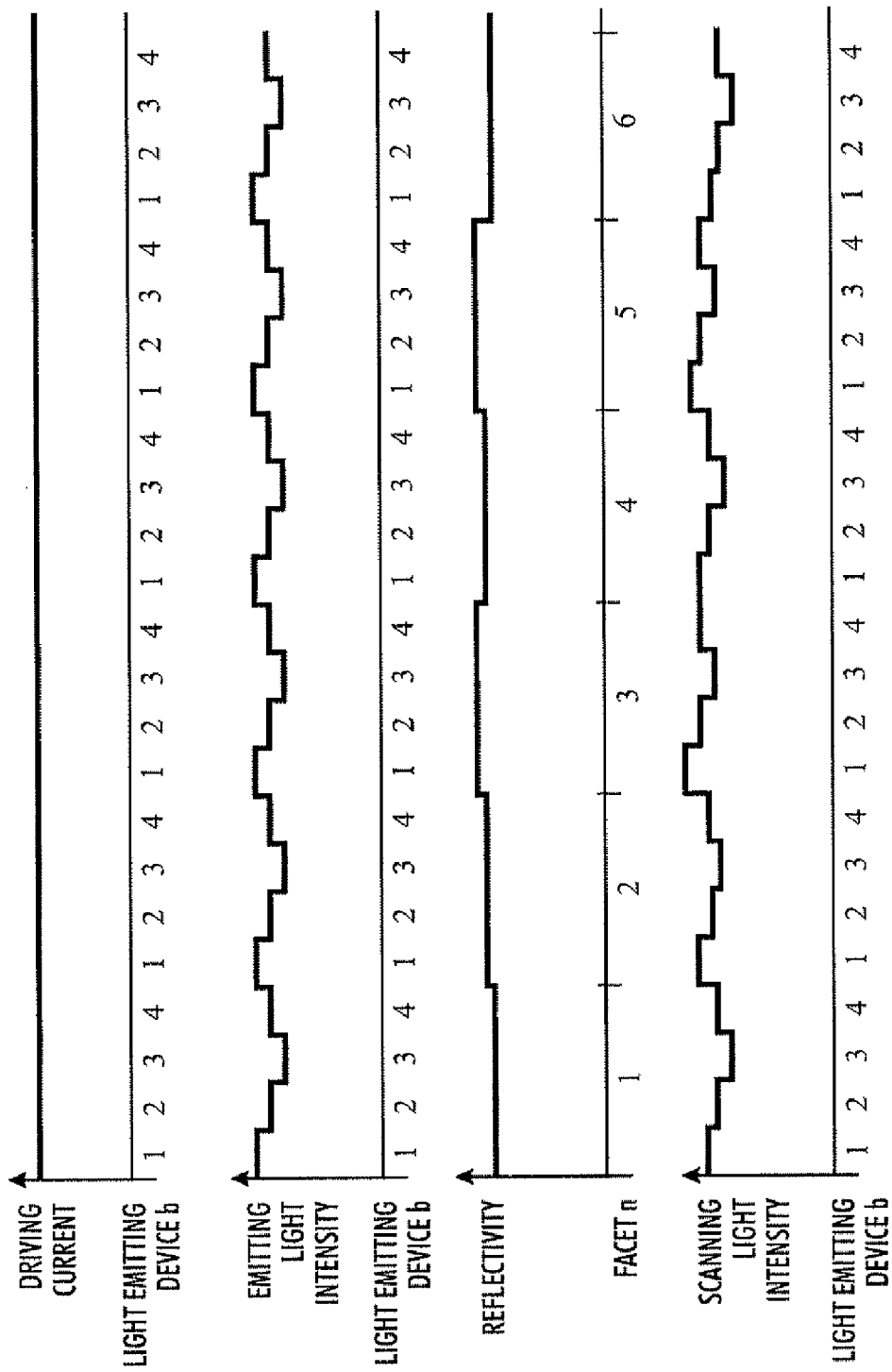
FIGS. 5A-B show an exemplary comparison of light intensities with and without error corrections.
Figure 5B:
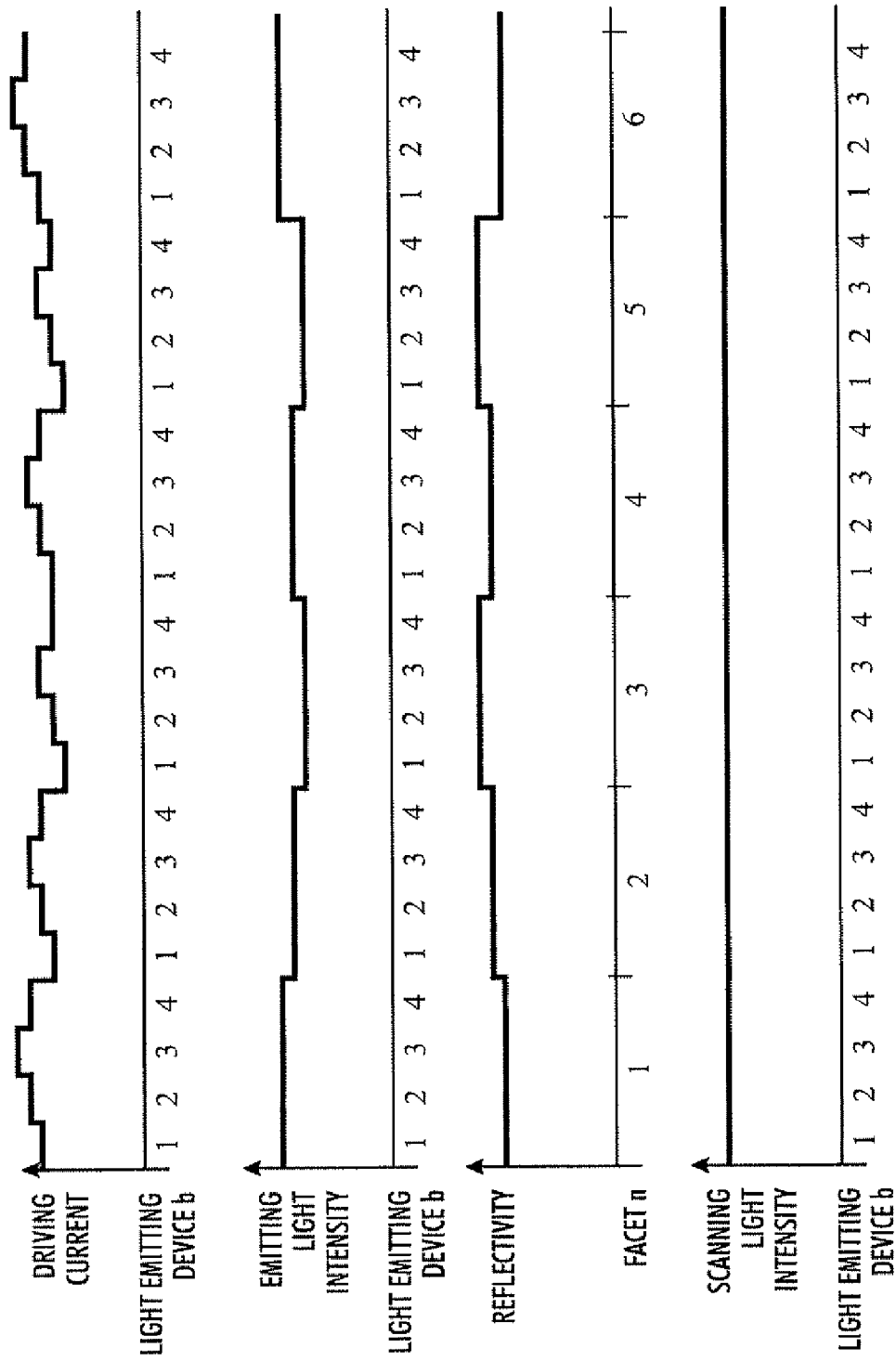

FIGS. 5A-B show an exemplary comparison of light intensities with and without error corrections. FIG. 5A shows an exemplary scenario without error corrections. As can be seen, four light emitting devices 1-4 can emit beam 1-4, which can be reflected by mirror facets 1-6. Uniform driving current can be applied to the light emitting device 1-4. Due to variations of the light emitting devices and the mirror facets, the scanning light beams can have large light intensity variation.

FIG. 5B show an exemplary scenario with error corrections according to the disclosure. As can be seen, the driving currents to the light emitting devices can be adjusted according to error corrections, which can be functions of light emitting devices and mirror facets, to compensate for the variations of the light emitting devices and the mirror facets. Therefore, the scanning light beams can have a substantially uniform light intensity.

Various benefits can be achieved according to the disclosure. For example, in an overscan mode, a first scanning light beam generated by a first combination of a first light emitting device and a first facet may scan a location that previous scanned by a second scanning light beam generated by a second combination of a second light emitting device and a second facet. Without the error corrections, the first scanning light beam may differ substantially from the second scanning light beam, which may lead to a low print quality. With the error corrections, according to the disclosure, the first scanning light beam and the second scanning light beam can have a substantially uniform light intensity. Therefore, the overscan print quality can be improved.

In another example, as a result of the error corrections, which can compensate for the reflectivity variations of the mirror facets, a loosened tolerance can be applied to the ROS system. Therefore, a lower cost MPA can be used to achieve high print quality. Further, a complex setup process may be simplified.

Figure 6:
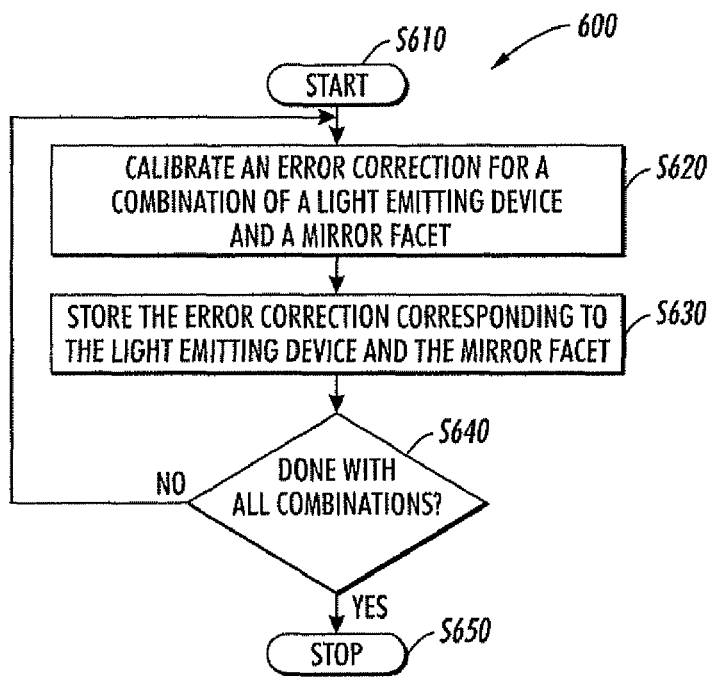
FIG. 6 shows a flow chart outlining an exemplary calibration process for error corrections.

FIG. 6 shows a flowchart outlining an exemplary calibration process for error corrections. The process 600 starts at step S610 and proceeds to step S620. In step S620, an error correction corresponding to a combination of a light emitting device and a mirror facet can be calibrated. In an embodiment, a photo-detector, such as an SOS detector can be included in the post-polygon optics. The photo-detector can detect a scanning light beam that can be generated by the light emitting device and reflected by the mirror facet. A light intensity of the light beam can be compared to a standard. An error correction can be calculated based on the detected light intensity and the standard. The process then proceeds to step S630.

In step S630, the error correction can be stored in a memory, such as a buffer table. In an embodiment, the error correction can be implemented in an algorithm as a function of the light emitting device and the mirror facet. In another embodiment, the error correction can be stored in a look-up table entry that corresponds to the light emitting device and the mirror facet. The process then proceeds to step S640.

In step S640, the process may determine whether error corrections have been calibrated for all combinations of the light emitting devices and the mirror facets. If the error corrections have been calibrated for all the combinations, the process proceeds to step S650 and terminates. Otherwise the process returns to step S620 to calibrate another error correction for a different combination.

Figure 7:
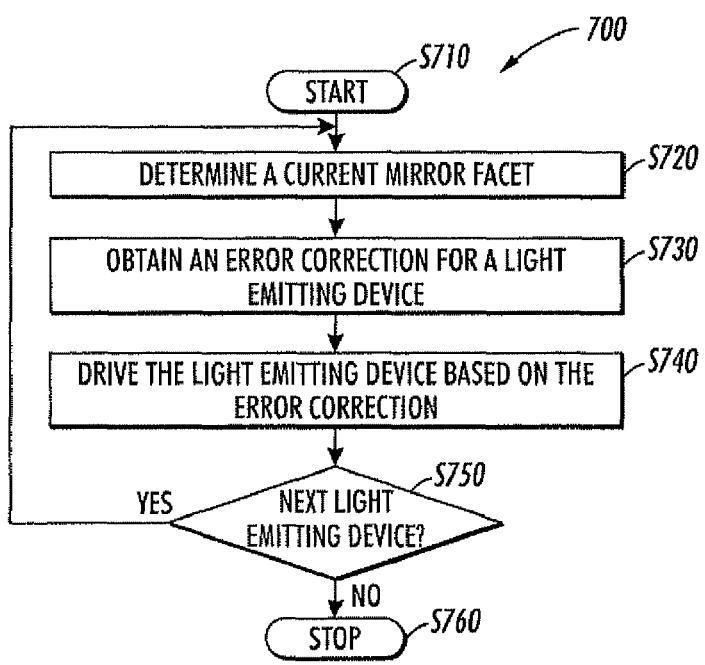
FIG. 7 shows a flow chart outlining an exemplary error correction process.

FIG. 7 shows a flowchart outlining an exemplary process for generating a light beam according to the disclosure. The process 700 starts at step S710 and proceeds to step S720. In step S720, a current mirror facet of an MPA can be identified. In an embodiment, a mirror facet can include an index mark, which may generate an index signal that can be detected. Further, a counter can be used to count a number of mirror facets, such as count detected SOS signals, that follows the mirror facet with the index mark. The number can be used to identify the current mirror facet. The process then proceeds to step S730.

In step S730, an error correction can be obtained from a look-up table. The error correction can correspond to a light emitting device and the current mirror facet. The process then proceeds to step S740. In step S740, the controller may provide a control current to the light emitting device to generate a light beam accordingly. The control current can be generated based on the error correction value. The process then proceeds to step S750.

In step S750, the process may determine if a next light emitting device exists. If all the light emitting devices have been properly controlled based on the respective error corrections, the process proceeds to step S760 and terminates.

Otherwise, the process returns to step S730 to obtain another error correction for a different light emitting device.

It will be appreciated that various of the above-disclosed and other features and functions, or alternatives thereof may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A method for printing, comprising:
identifying a current mirror facet of a motor polygon assembly (MPA) including multiple mirror facets, wherein each mirror facet has a reflectivity characteristic;
determining a driving signal based on the reflectivity characteristic of the current mirror facet and a performance characteristic of a light source, the light source comprises a plurality of light emitting devices that emit a plurality of light beams;
measuring a light intensity error of a light emitting device as the performance characteristic of the light emitting device;
measuring a reflectivity error of the current mirror facet as the reflectivity characteristic of the current mirror facet, wherein the driving signal includes a driving power to the light emitting device, which is determined as a product of the light intensity error and the reflectivity error; and
driving the light source based on the driving signal to emit light that is reflected by the MPA onto a photoreceptor.

2. The method according to claim 1, further comprising:
storing the error correction corresponding to the light emitting device and the current mirror facet.

3. The method according to claim 1, wherein determining the driving signal further comprises:
obtaining an entry corresponding to the current mirror facet and the light emitting device in a buffer table, wherein the buffer table comprises at least a first dimension of the multiple mirror facets and a second dimension of the plurality of light emitting devices.

4. The method according to claim 1, wherein determining the driving signal further comprises:
driving a light emitting device with a first driving power to emit a light beam that is reflected by the current mirror facet;
measuring a light intensity of the reflected light beam;
calculating an error of the light intensity to a desired light intensity; and
determining the driving signal, which includes a second driving power to the light emitting device based on the error.

5. The method according to claim 1, wherein the driving signal includes a function of time.

6. The method according to claim 1, wherein identifying the current mirror facet of the MPA, further comprise:
detecting an index signal of a first mirror facet having an index mark; and
counting a number of a scan signal, wherein the scan signal comprises at least one of a start of scan (SOS) signal and an end of scan (EOS) signal.

7. A raster output scanner (ROS), comprising:
a light source configured to include a plurality of light emitting devices that generate a plurality of light beams;
a motor polygon assembly (MPA) configured to include multiple mirror facets to reflect the plurality of light beams;
a controller coupled to the light source, the controller being configured to identify a current mirror facet of the MPA, determine an error correction for a light emitting device corresponding to the current mirror facet based on a combination of the current mirror facet and the light emitting device, and drive the light emitting device based on the error correction to emit a light beam, the light beam being reflected by the current mirror facet;
a memory configured to store the error correction corresponding to the current mirror facet and the light emitting device;
a first array configured to store a plurality of light intensity errors corresponding to the plurality of light emitting devices respectively;
a second array configured to store multiple reflectivity errors corresponding to the multiple mirror facets; and
an algorithm configured to calculate the error correction based on a light intensity error of the light emitting device multiplied by a reflectivity error of the current mirror facet.

8. The ROS according to claim 7, wherein the memory further comprises:
a buffer table configured to include at least a first dimension of the multiple mirror facets and a second dimension of the plurality of light emitting devices.

9. The ROS according to claim 7, further comprising:
a splitter configured to split a portion of the light beam emitted from the light emitting device to measure a light intensity of the light emitting device.

10. The ROS according to claim 7, further comprises:
a detector configured to measure a light intensity of the light beam after being reflected by the current mirror facet.

11. The ROS according to claim 7, further comprises:
a scan signal detector configured to detect at least one of a start of scan signal and an end of scan signal.

12. The ROS according to claim 7, wherein the controller further comprise:
an analog to digital converter (ADC) configured to convert a sampled light intensity of the light beam after being reflected by the current mirror facet to a digital value, the controller being configured to determine the error correction based on the digital value; and
a digital to analog converter (DAC) configured to convert the error correction from a digital form to an analog form.

13. A printing system, comprising:
a photoreceptor configured to be charged with a substantially uniform potential; and
a raster output scanner (ROS) system configured to scan the photoreceptor according to data of a desired image, wherein the ROS system further comprises:
a light source configured to include a plurality of light emitting devices that generate a plurality of light beams;
a motor polygon assembly (MPA) configured to include multiple mirror facets to reflect the plurality of light beams to the photoreceptor;
a controller coupled to the light source, the controller being configured to identify a current mirror facet of the MPA, determine an error correction for a light emitting device corresponding to the current mirror facet based on a combination of the current mirror facet and the light emitting device, and drive the light emitting device based on the error correction to emit a light beam, the light beam being reflected by the current mirror facet to scan the photoreceptor;

a memory configured to store the error correction corresponding to the current mirror facet and the light emitting device;

a first array configured to store a plurality of light intensity errors corresponding to the plurality of light emitting devices respectively;

a second array configured to store multiple reflectivity errors corresponding to the multiple mirror facets; and an algorithm configured to calculate the error correction based on a light intensity error of the light emitting device multiplied by a reflectivity error of the current mirror facet.

14. The printing system according to claim 13, wherein the memory further comprises:

a buffer table configured to include at least a first dimension of the multiple mirror facets and a second dimension of the plurality of light emitting devices.

15. The printing system according to claim 13, further comprising:

a splitter configured to split a portion of the light beam emitted from the light emitting device to measure a light intensity of the light emitting device.

16. The printing system according to claim 13, further comprises:

a detector configured to measure a light intensity of the light beam after being reflected by the current mirror facet.

17. The printing system according to claim 13, further comprises:

a scan signal detector configured to detect at least one of a start of scan signal and an end of scan signal.

18. The printing system according to claim 13, wherein the controller further comprise:

an analog to digital converter (ADC) configured to convert a sampled light intensity of the light beam after being reflected by the current mirror facet to a digital value, the controller being configured to determine the error correction based on the digital value; and a digital to analog converter (DAC) configured to convert the error correction from a digital form to an analog form.

* * * * *